Nov. 30, 1926. 1,608,830
W. C. ALFORD ET AL
AUTOMOBILE HEADLIGHT
Filed August 1, 1925
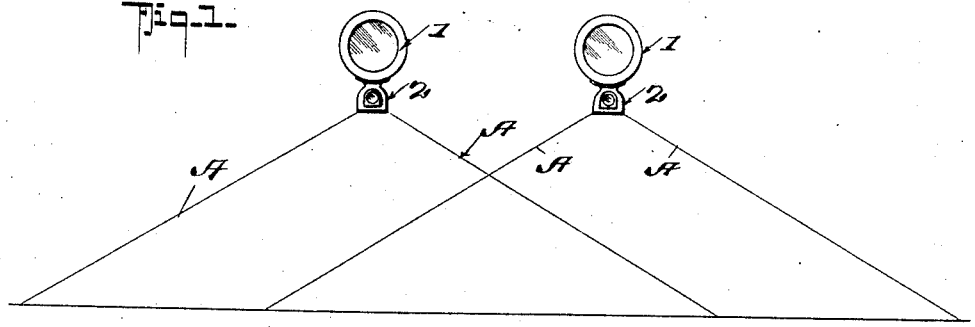
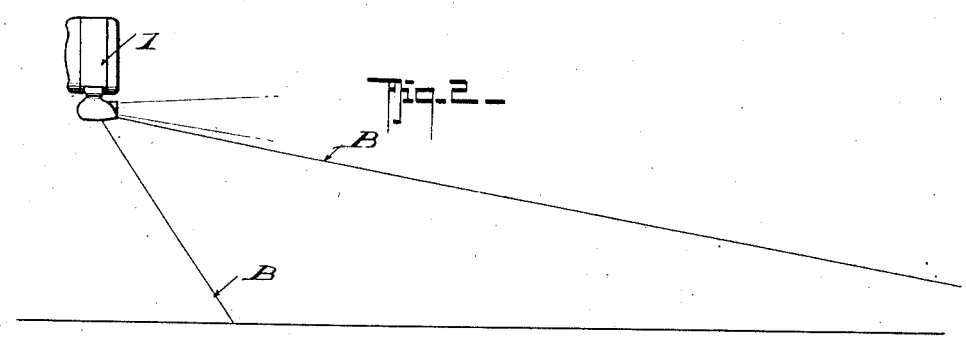
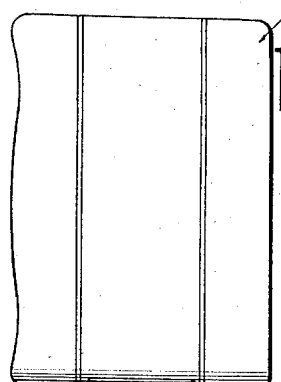
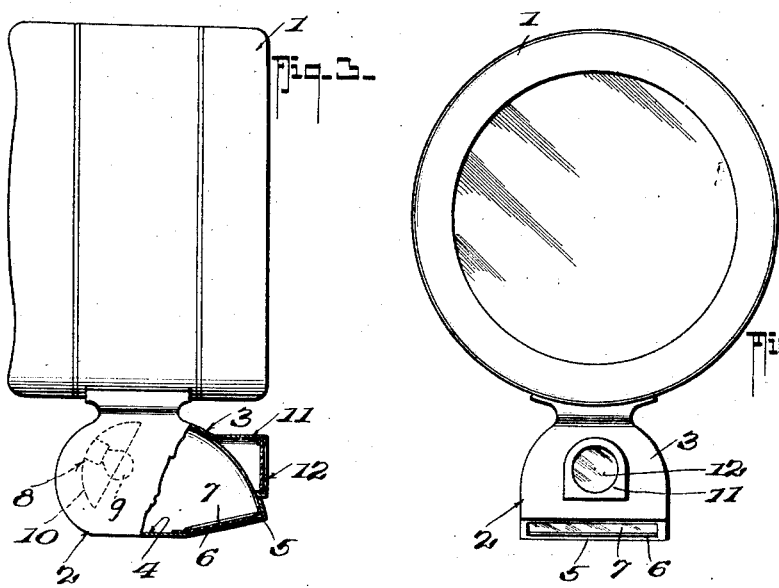
WITNESSES
W. A. Williams
INVENTORS
W. C. Alford
W. M. Cassett
BY
Munn & Co.
ATTORNEYS Patented Nov. 30, 1926.

1,608,830

UNITED STATES PATENT OFFICE.

WILLIAM CUTTER ALFORD, OF NASHVILLE, TENNESSEE, AND WILLIAM MARTIN CASSETTY, JR., OF MIAMI, FLORIDA.

AUTOMOBILE HEADLIGHT.

Application filed August 1, 1925. Serial No. 47,502.

This invention relates to an improvement in headlights adapted for use on automobiles and also on various other vehicles.

One of the principal objects of the present invention resides in the provision of a device of this character which utilizes the ordinary high powered headlight to secure the advantages thereof but which also embodies means for supplying adequate illumination and signalling facilities when passing other cars, pedestrians or the like while eliminating the blinding glare so liable to result in accident and injury.

A further object is to provide a device of this character which may be used in conjunction with the ordinary headlight designs and which is of simple and durable construction, reliable and effective in operation and easy and comparatively inexpensive to manufacture.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1 is a diagrammatic view in front elevation illustrating how the undimmed rays of light from the auxiliary lighting devices are spread laterally, Figure 2 is a similar view in side elevation, Figure 3 is a fragmentary view partly in side elevation and partly in longitudinal vertical section showing a headlight constructed in accordance with the present invention, and Figure 4 is a view of the same in front elevation.

Referring to the drawings, the members of a pair of conventional headlights are designated at 1. These headlights have the usual projectors for projecting powerful beams of light and the present invention proposes to use the headlight 1 except when passing pedestrians or other vehicles. Instead of dimming the headlights 1 and thereby depriving the driver of the car of the illumination essential to proper and safe control over the car, the present invention provides an auxiliary lighting device designated generally at 2 on each headlight.

Each auxiliary lighting device 2 comprises a casing 3 suitably secured to the under portion of the headlight casing on which it is mounted. The bottom wall 4 of each casing has its forward portion 5 upwardly inclined as shown in Figure 3 and in each upwardly inclined portion 5 a light emitting opening 6 is formed. A lens or a suitable panel 7 may be provided for each opening 6. With this arrangement the light emitting opening is exposed to view at the lower portion of the front of the casing and at the forward portion of the bottom of the casing and this opening extends transversely of the casing for its full width.

Within each casing 3, a projector 8 is arranged and includes an electric lamp 9 and a parabolic reflector 10. The lamp 9 is of the same candlepower as that employed in the headlights 1 and is coupled up in the dimmer circuit. Here however no resistance element is provided in the dimmer circuit so that current of the same value as supplied to the lamps of the headlights 1 is supplied to the lamps 9 when the lighting switch on the dash is turned to switch off the headlights 1 and turn on the auxiliary lighting devices 2. In other words the projectors 8 emit light beams of the same intensity and power as the projectors of the headlights 1 but the auxiliary lighting devices handle and control their light beams in such a manner as to prevent glare or blinding rays from reaching the eyes of pedestrians or drivers of oncoming vehicles while affording adequate illumination while passing the pedestrians or other vehicles.

Each casing 3 is opaque except for its light emitting opening 6 and a front opening 11 in which a light absorbing and subduing element such as a heavy and colored glass panel 12 is fitted. Only indirect rays proceed through the opening 11 and these are dimmed and subdued. The light rays proceeding from the openings 11 are not relied upon to contribute to any great extent to the illuminating effect but are in the main depended upon to define the lateral limits of the automobile.

As shown in Figure 1 the rays of light proceeding from the auxiliary lighting devices diverge laterally within the limits of lines A while these same rays extend downwardly along and below the lines B. All of the light proceeding from the auxiliary lighting devices is below the headlights 1.

We claim:

In combination with a headlight, an auxiliary lighting device adapted to be used when the headlight is turned off and comprising a horizontally disposed closed casing supported below the headlight and having a substantially vertical front wall and a bottom wall extending substantially horizontally for the major portion of its length but having an upwardly and forwardly inclined portion at its front, the upwardly and forwardly inclined portion merging into the front wall, said upwardly inclined portion having a transverse light emitting opening therein, the front wall of the casing of the auxiliary lighting device having a colored translucent panel, and a source of light and inclined reflector positioned in the rearward portion of the casing of the auxiliary lighting device so as to project light through both the opening and the panel.

WILLIAM CUTTER ALFORD.
WILLIAM MARTIN CASSETTY, Jr.